ized the display of the signs in reverse order, continuing in-
UNITED STATES PATENT OFFICE.

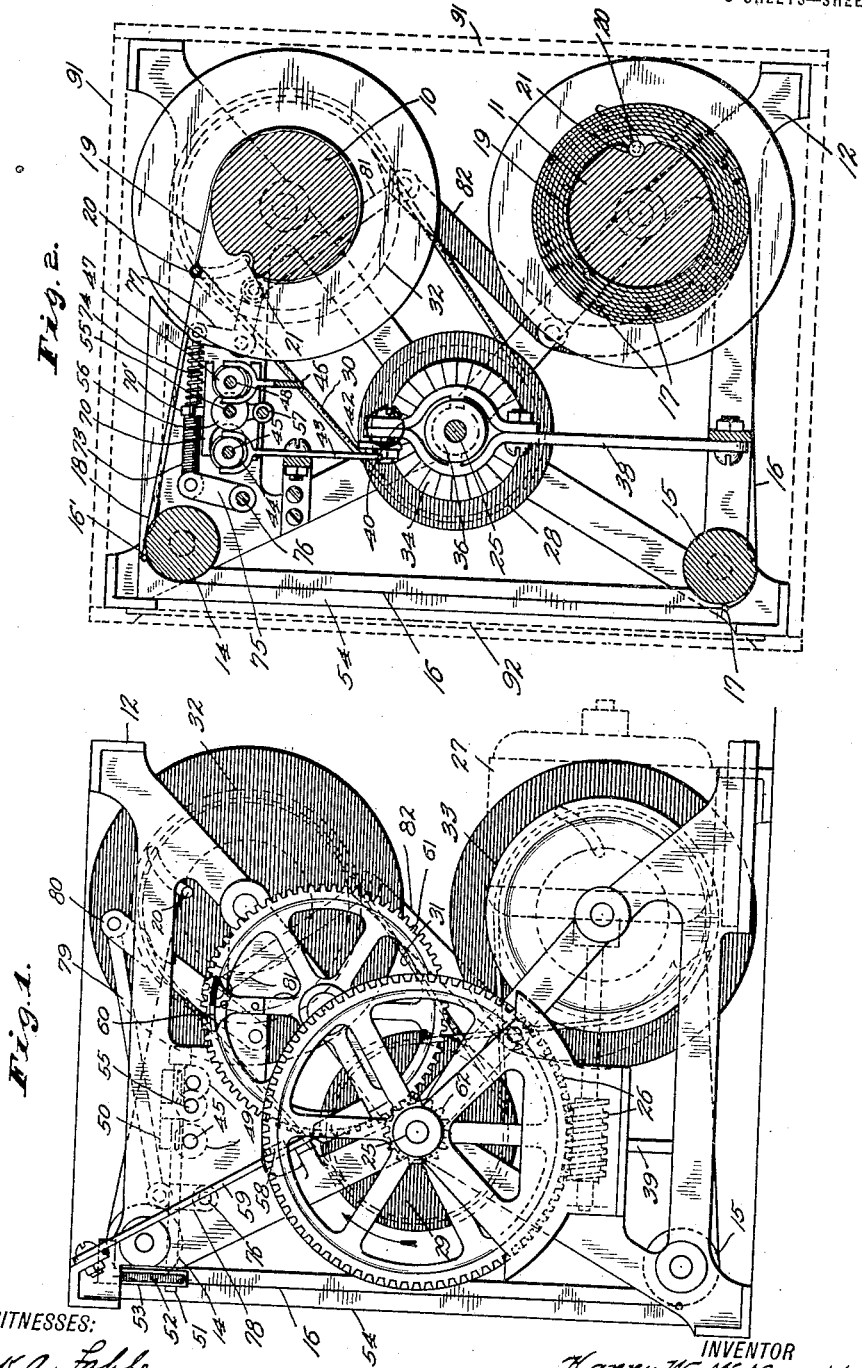

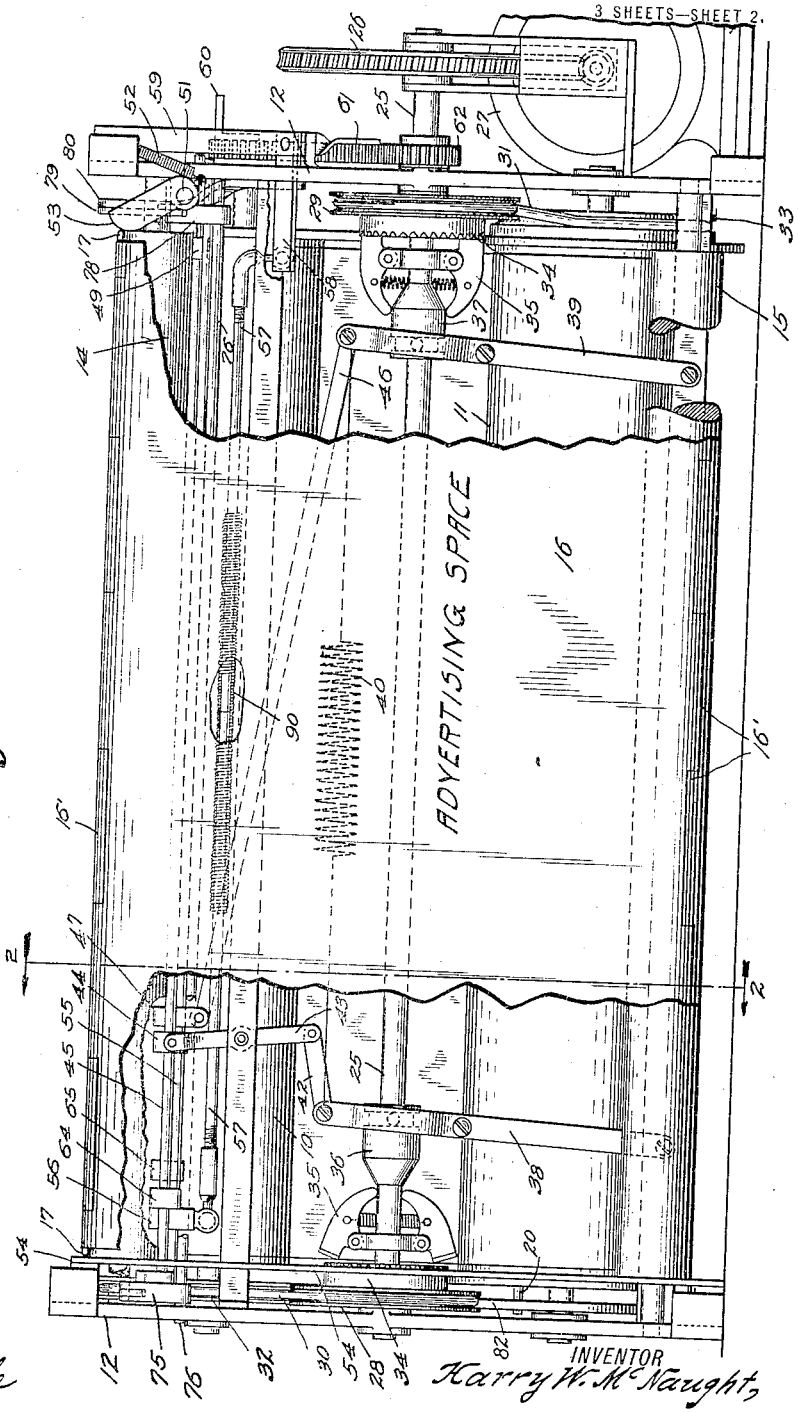

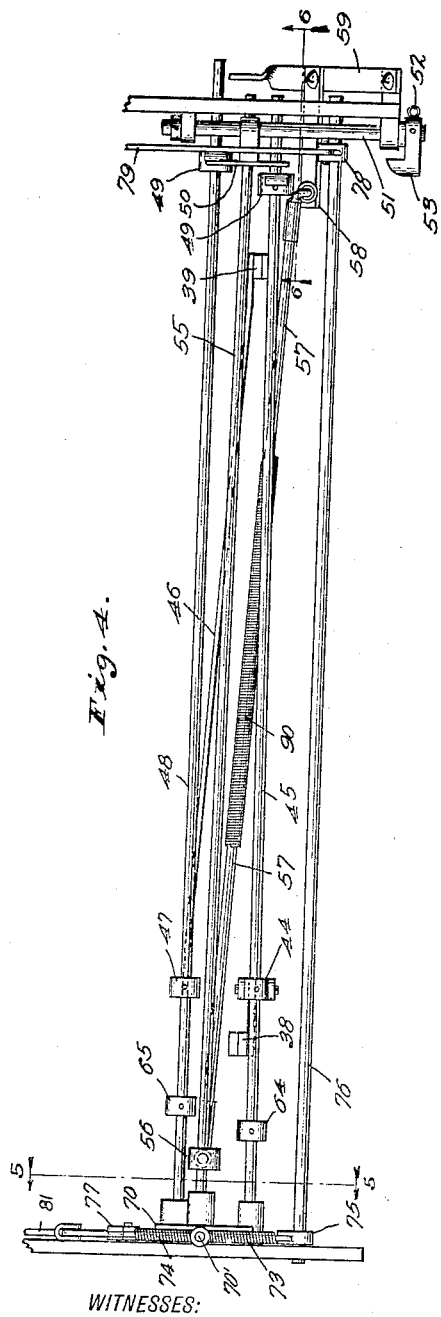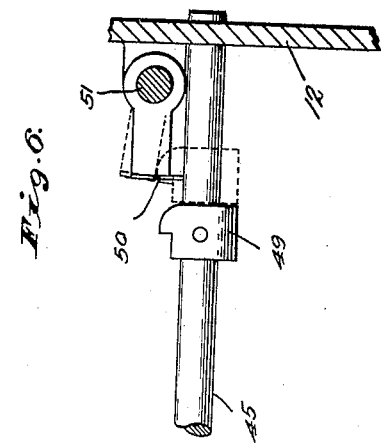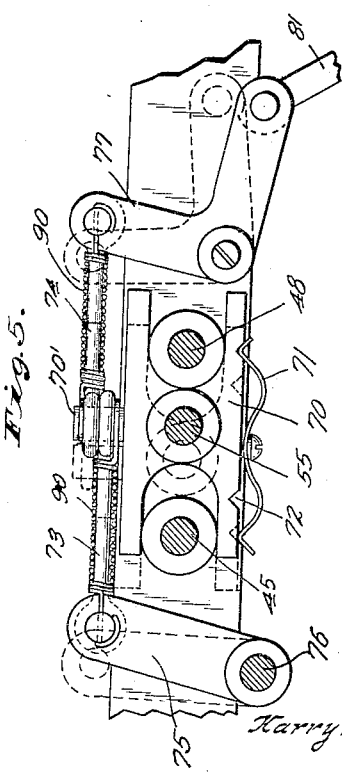

HARRY W. McNAUGHT, OF INDIANAPOLIS, INDIANA.

DISPLAY APPARATUS.

1,252,597. Specification of Letters Patent. Patented Jan. 8, 1918.

Application filed April 10, 1916. Serial No. 90,033.

*To all whom it may concern:*

Be it known that I, HARRY W. McNAUGHT, a citizen of the United States, residing at Indianapolis, in the county of Marion and State of Indiana, have invented a new and useful Display Apparatus, of which the following is a specification.

It is the object of my invention to provide a display device, particularly for advertising purposes, which will display a series of signs successively, allowing each sign to remain displayed for a predetermined time, and which when the end of the series is reached will repeat the display of the signs in reverse order, continuing indefinitely.

The accompanying drawings illustrate my invention. Figure 1 is an end elevation of a display device embodying my invention; Fig. 2 is a vertical section through this display device, being taken on the line 2—2 of Fig. 3 and looking in the same direction as in Fig. 1; Fig. 3 is a front elevation of this display device, with the advertising sheet and some of the other parts partly broken away; Fig. 4 is a fragmentary plan view of part of the control mechanism; Fig. 5 is a section on the line 5—5 of Fig. 4; and Fig. 6 is a section on the line 6—6 of Fig. 4.

Two winding drums 10 and 11 are mounted on parallel horizontal axes in a frame 12 near the rear upper and rear lower corners thereof respectively, and two idler rollers 14 and 15 are mounted on horizontal axes parallel to the drums 10 and 11 and near the front upper and front lower corners respectively of such frame. The display sheet extends from the drum 10 over the idler roller 14, then vertically down at the front part of the frame 12 to and under the idler roller 15, and thence to the lower drum 11, as is clear from Figs. 1 and 2. The display sheet consists of a series of separable sections 16 each of proper length to extend from the idler roller 14 to the idler roller 15, as clear from Fig. 2, and these separable sections are provided at their opposite ends with hinge sockets 16' which interdigitate with corresponding hinge sockets on the adjacent sections 16 to receive a hinge rod 17 whereby the portions are hinged together. The hinge rods 17 extend laterally beyond the edges of the display sheet, as is clear from Fig. 3, for reasons hereinafter explained. Each end section of the series of display sheets 16 is connected by a strip 18 of proper length to one edge of a strip of canvas or other fabric 19 wound once around the drum 10 or 11 and having its other edge fastened to such drum, the strips 18 and 19 being hinged together around a hinge rod 20 which when the strips 18 and 19 are wrapped upon the drum 10 or 11 is received in a longitudinal groove 21 in such drum 10 or 11, as illustrated by the lower drum 11 in Fig. 2. This hinge rod 20 also projects laterally a considerable distance beyond the edge of the display strip, for reasons hereinafter explained, one hinge rod projecting toward one side and one toward the other.

A drive shaft 25 parallel to the drums 10 and 11 is mounted within the figure formed by such drums and the two idler rollers 14 and 15, and is connected by worm gearing 26 to the shaft of a driving motor 27 so as to be driven thereby at relatively slow speed. Two sheaves 28 and 29 are loosely mounted on the drive shaft 25, and are connected by belts 30 and 31 to sheaves 32 and 33 on the drums 10 and 11 respectively, the belt 30 being straight and the belt 31 crossed so that each drum 10 or 11 when driven is driven in the direction to wind the display sheet on it. Either sheave 28 or 29 may be clutched to the drive shaft 25 by any suitable form of clutch, each such sheave being shown as provided with a toothed clutch member 34 coöperating with spring-released clutch pawls 35 which may be set by a shifting cone 36 or 37 to clutch the sheave 28 or 29 respectively to such drive shaft 25. The cones 36 and 37 are slidable along the drive shaft 25 by levers 38 and 39, being movable outwardly to set the clutch pawls 35 and inwardly to release such clutch pawls; and the levers 38 and 39 are connected by a tension spring 40 which tends to move them inward so as to release the clutches. The shift lever 38 is connected by a link 42 to one end of a lever 43 pivoted on a longitudinal bar of the frame 12 and connected at its other end to a collar 44 adjustably fixed on a slidable shift rod 45 mounted in the frame 12 and extending from one end to the other thereof. The shift lever 39 is connected by a link 46 to a collar 47 adjustably fixed on a second slidable shift rod 48, paralleling the shift rod 45. By reason of the connection of these shift rods 45 and 48 to the shift levers 38 and 39 the spring 40 tends to move both of these shift rods to the left (Figs. 3 and 4). Either one of them may be held to the right against the action of the spring 40 by a latch collar 49 adjustably fixed on such shift rod, the two latch collars 49 coöperating in common with a latch 50 carried by a rock shaft 51 transverse to the shift rods 45 and 48 near their right hand ends (Fig. 4) and spring-pressed in a counterclockwise direction (Fig. 3) by a tension spring 52. The rock shaft 51 is provided at its forward end with a cam 53 which is engaged by the projecting end of each hinge rod 17 (at the right in Fig. 3) to rock such cam 53 and the rock shaft 51 against the spring 52 to disengage the latch 50 from the collar 49 and allow the rod 45 or 48 as the case may be to be shifted to the left by the spring 40 when any such hinge rod 17 passes in either direction over the front part of the roller 14. In order to keep the cam 53 from shifting the hinge rod 17 axially, a slide plate 54 is provided for the other end of such hinge rod (at the left in Fig. 3) to abut against at the time such hinge rod coöperates with the cam 53.

In order to move the shift rod 45 or 48 to the right (Figs. 3 and 4) against the spring 40, a slide rod 55 is provided between the shift rods 45 and 48. The left hand end of this rod (Fig. 4) is shiftable, by mechanism hereinafter described, transversely of the rod toward either shift rod 45 or 48, being shown in Fig. 4 as shifted toward the rod 48. Mounted on this end of the operating rod 55 is a collar 56, which is connected by a link 57 to a lateral arm 58 from a lever 59 mounted at the right (Figs. 3 and 4) of the frame. The free end of the lever 59 is in the path of a cam 60 carried by the side face of a gear 61 driven by a pinion 62 fixed on the drive shaft 25, so that the gear 61 rotates much slower than the drive shaft 25. When the cam 60 engages the lever 59 it moves it to the right (Figs. 3 and 4) to move the link 57 and collar 56 in the same direction. The collar 56 coöperates with a collar 64 adjustably fixed on the shift rod 45 or with a collar 65 adjustably fixed on the shift rod 48, according to the position of the left hand end of the slide rod 55, to move the shift rod 45 or 48 toward the right against the spring 40 to move the clutch cone 36 or 37 outward to clutch the sheave 28 or 29 to the drive shaft 25 and thereby drive either drum 10 or 11 in the winding direction. The shift rod 45 or 48 thus shifted is held to the right by the latch collar 49 and latch 50 until released by the action of the hinge rod on the cam 53 as already explained, whereupon the spring 40 moves such shift rod to the left and the clutch cone 36 or 37 inwardly to unclutch the previously clutched sheave 28 or 29 from the drive shaft 25 and stop the further movement of the drum 10 or 11. In order to shift the left hand end of the slide rod 55, such end is mounted in a shift plate 70 which may be shifted between the full and dotted line positions shown in Fig. 5, being held in either position by the engagement of a leaf spring 71 with a notch 72 in the edge of such shift plate. When the shift plate is in the full line position the collar 56 coöperates with the collar 65; when it is in the dotted line position the collar 56 coöperates with the collar 64. A pin 70' on the shift plate 70 is connected by two links 73 and 74 to an arm 75 fixed on a shaft 76 and to a bell-crank lever 77 respectively. The shaft 76 extends from one end of the frame 12 to the other, and at the right hand end has fixed thereon an arm 78 which is connected by a link 79 to a pivoted arm 80 provided with a notch for receiving the projecting end of the hinge rod 20 associated with the upper winding drum 10 when the display sheet on such drum is exhausted and the fabric strip 19 commences to unwind so as to cause said hinge rod 20 to be lifted out of the groove 21, as clear from Fig. 2. Upon this engagement, the arm 80 and shaft 76 are turned in a counterclockwise direction (Figs. 1, 2, and 5) to shift the shift plate 70 to the left (Fig. 5) so as to cause the collar 56 to coöperate with the collar 64 to control the clutch cone 36 for the upper winding drum 10. The bell-crank lever 77 is connected by a link 81 to a lever 82 provided with a notch similar to the notch in the pivoted arm 80 for coöperation for receiving the projecting end of the hinge rod 20 associated with the lower winding drum 11 when the display sheet on such drum is exhausted and the fabric strip 19 commences to unwind so as to cause said hinge rod 20 to be lifted out of the groove 21. Upon this engagement, the arm 82 and bell-crank lever 77 are turned in a clockwise direction (Figs. 2 and 5) to shift the shift plate 70 to the right (Fig. 5) so as to cause the collar 56 to coöperate with the collar 65 to control the clutch cone 37 for the lower winding drum 11.

In operation, the motor 27 is set in operation, and drives the drive shaft 25 and the gear 61 continuously, the movement of the gear 61 being relatively slow. Assume that the left hand end of the slide rod 55 is toward the shift rod 48, as shown in Fig. 4. Then, whenever the cam 60 engages the lever 59 to move the collar 56 to the right it causes such collar to engage the collar 65 and move the shift rod 48 correspondingly to the right, in which position it is held by the latch collar 49 and latch 50. This shifting of the shift rod 48 causes the clutch cone 37 to be shifted outward to clutch the sheave 29 to the drive shaft 25, to drive the lower winding drum 11 in the winding direction. The movement of the winding drum continues until the next hinge rod 17 engages the cam 53, by which time a new section 16 of the display sheet has been brought between the idler rollers 14 and 15 into position with display. The engagement of the hinge rod 17 with the cam 53 causes the disengagement of the latch 50 from the collar 49, and allows the spring 40 to move the shift rod 48 and the clutch cone 37 to the left to unclutch the sheave 29 from the drive shaft 25 and discontinue the operation of the winding drum 11, thus leaving the new display sheet in view. The movement of the display sheet takes place during a very small portion of the rotation of the gear 61. The display sheet remains in view until the rotation of the gear 61 is completed, whereupon the cam 60 again engages the lever 59, and the foregoing operation is completed to bring another display sheet into view. This action is repeated until the condition shown in Fig. 2 is reached, whereupon the hinge rod 20 engages the notch in the pivoted arm 80 to move the latter, and thereby, through the connections already explained, to move the shift plate 70 to the left (Fig. 5) to move the left hand end of the slide rod 55 (Fig. 4) away from the shift rod 48 and close to the shift rod 45, so that the collar 56 may coöperate with the collar 64. When the cam 60 now engages the lever 59, it operates the collar 56 as before, but the collar 56 moves the collar 64 instead of the collar 65, to cause the clutch cone 36 to act to clutch the sheave 28 to the drive shaft 25, so as to produce driving of the upper winding drum 10 instead of the lower winding drum 11, thereby reversing the movement of the display sheet 16. As before, the hinge rods 17 coöperate with the cam 53 to stop the action of the winding drum when a new section of the display sheet has been brought into view.

In order to prevent breakage, the links 57, 73, and 74 are each made as spring extension links, in which a tension spring 90 is wound around two abutting ends of the link rod so as to hold such ends together. Normally this spring link acts as a solid body, but in case of some obstruction to the movement of the parts the spring 90 stretches to permit the two link ends to separate, thus avoiding breakage.

In actual installation, the whole apparatus is inclosed in a casing 91, which is provided on its front face with a glass plate 92 through which the exposed section of the display sheet 16 may be seen. This apparatus may be set in a store window and allowed to operate for hours without attention, the different display sheets being shown *seriatim* first in one order and then in the reverse order until the operation is stopped by shutting down the motor 27.

I claim as my invention:

1. A display apparatus, comprising a movable display sheet composed of a plurality of sections, adjacent sections being provided at their edges with interdigitating hinge pockets, hinge rods passing through said interdigitating hinge pockets to join the sections together, so that sections may be inserted or removed to vary the length of the display sheet, a constantly running motor for moving said display sheet, a clutch for connecting and disconnecting the motor for operating the display sheet, means controlled by successive hinge rods as the display sheet is moved for releasing said clutch, and means controlled by the operation of the motor for setting said clutch after each such release until the end of the display sheet is reached regardless of its length.

2. A display device, comprising a movable display sheet of variable length, a constantly running motor for moving said display sheet, a clutch for connecting and disconnecting the motor for operating the display sheet, means controlled by the movement of the display sheet for releasing said clutch, and means controlled by the operation of the motor for setting said clutch after each such release until the end of the display sheet is reached regardless of its length.

3. A display device, comprising a movable display sheet, two winding drums carrying said display sheet and attached to the ends thereof so that the display sheet can be wound from one drum to the other to display different parts of the display sheet, a constantly running motor, a connection between said motor and each of said drums for operating it in the winding direction, a clutch in each connection, means controlled by the movement of the display sheet for operating on either of said clutches to release it, means operated by the movement of the motor to set a clutch, and means controlled by the unwinding of the display sheet from either drum for selectively controlling the action of said releasing means and said setting means on said clutches.

4. A display device, comprising a movable display sheet, two winding drums carrying said display sheet and attached to the ends thereof so that the display sheet can be wound from one drum to the other to display different parts of the display sheet, a constantly running motor, a connection between said motor and each of said drums for operating it in the winding direction, a clutch in each connection, means controlled by the movement of the display sheet for operating on either of said clutches to release it, and means controlled by the unwinding of the display sheet from either drum for selectively controlling the action of said releasing means on said clutches.

In witness whereof, I have hereunto set my hand at Indianapolis, Indiana, this fourth day of April, A. D. one thousand nine hundred and sixteen.

HARRY W. McNAUGHT.